United States Patent [19]

Aptéet al.

[11] Patent Number: 5,874,377

[45] Date of Patent: *Feb. 23, 1999

[54] SINTERED SILICON NITRIDE PRODUCT

[75] Inventors: Prasad Shrikrishna Apté, St. Albert; Larry Roy Morris, Yarker, both of Canada

[73] Assignee: Microwear Corporation, Fort Saskatchewan, Canada

[*] Notice: This patent issued on a continued prosecution application filed under 37 CFR 1.53(d), and is subject to the twenty year patent term provisions of 35 U.S.C. 154(a)(2).

[21] Appl. No.: 798,051

[22] Filed: Feb. 10, 1997

Related U.S. Application Data

[60] Continuation of Ser. No. 443,411, May 17, 1995, abandoned, which is a division of Ser. No. 220,840, Mar. 31, 1994, abandoned.

[51] Int. Cl.$^6$ .................................................. C04B 35/587
[52] U.S. Cl. ............................................................ 501/97.2
[58] Field of Search ............................... 501/97, 98, 97.2

[56] References Cited

U.S. PATENT DOCUMENTS

| | | |
|---|---|---|
| 3,585,258 | 6/1971 | Levinson et al. . |
| 4,147,911 | 4/1979 | Nishitani ........................ 219/10.55 M |
| 4,666,775 | 5/1987 | Kim et al. ............................. 428/398 |
| 4,810,846 | 3/1989 | Holcombe, et al. ............. 219/10.55 R |
| 4,880,578 | 11/1989 | Holcombe et al. ....................... 264/26 |
| 4,941,905 | 7/1990 | Narasimham ............................ 65/3.12 |
| 4,963,709 | 10/1990 | Kimery, Jr. ..................... 219/10.55 M |
| 4,978,645 | 12/1990 | Ukyo et al. ........................... 501/97 X |
| 4,990,403 | 2/1991 | Ito .......................................... 428/408 |
| 5,010,220 | 4/1991 | Apte et al. ...................... 219/10.55 M |
| 5,072,087 | 12/1991 | Apte et al. . |
| 5,154,779 | 10/1992 | Holcombe et al. ...................... 148/207 |
| 5,164,130 | 11/1992 | Holcombe et al. ....................... 264/26 |
| 5,194,408 | 3/1993 | Stamp et al. ............................... 501/88 |
| 5,202,541 | 4/1993 | Patterson et al. .............. 219/10.55 M |
| 5,227,600 | 7/1993 | Blake et al. .................... 219/10.55 M |
| 5,384,292 | 1/1995 | Matsui et al. ............................ 501/97 |
| 5,401,450 | 3/1995 | Mitomo et al. ........................ 501/97.2 |
| 5,556,815 | 9/1996 | Boberski et al. ......................... 501/97 |
| 5,622,905 | 4/1997 | Matsuura et al. ........................ 501/97 |

FOREIGN PATENT DOCUMENTS

| | | |
|---|---|---|
| 2000109 | 4/1991 | Canada . |
| 2001062 | 4/1991 | Canada . |
| 2 028 067 | 4/1992 | Canada . |
| 1 597 998 | 5/1978 | European Pat. Off. . |
| 48-89911 | 11/1973 | Japan . |
| 53-44930 | 12/1978 | Japan . |
| 56-30834 | 3/1981 | Japan . |
| WO 91/05747 | 10/1990 | WIPO . |

OTHER PUBLICATIONS

Kiggans, J.O., et al., 1991. "Characterization of Silicon Nitride Synthesized by Microwave Heating, " *Am. Ceram. Soc.*, vol.21, pp. 267–272, 1991.

Ferber, M.K., et al., 1991. "Effect of Post–Sintering Microwave Treatments Upon the Mechanical Performance of Silicon Nitride," *Ceram. Eng. Proc.*, 9–19, 1991.

Tiegs, T.N., et al., 1991. "Microwave Sintered Silicon Nitride Ceramic," *European Ceram. Soc. Second Conference*, Augsburg, Germany, Sept. 11–14, 1991.

Tiegs, T.M., et al., "Sintered Reaction–Bonded Silcon Nitride by Microwave Heating," *MRS Proceedings*, vol. 287, pp. 283–288.

Tiegs, T.N., et al., 1991. "Microwave Sintering of Silicon Nitride," *Ceram. Eng. Proc.*, 9–10, 1991.

Sutton, W.H., 1989. "Microwave Processing of Ceramic Materials," *Ceramic Bulletin*, vol.68, No.2, 1989, pp.376–386.

Palaith, et al., 1989. "Microwave Joining Ceramics," vol.68, No.9, 1989, pp.601–1605.

*Tiegs, T.N., et al., 1993. "Cost–Effective Sintered Reaction–Bonded Silicon Nitride (SRBSN) For Structural Ceramics," Ceramic Eng. Sci. Proceedings, 14 (1–2), pp. 318–388, 1993.*

Tiegs, T.M., et al., 1991. "Microstructure Development During Microwave Annealing of Dense Silicon Nitride," *Am. Ceram. Soc.*, Westerville, OH (1991).

*Primary Examiner*—Karl Group
*Attorney, Agent, or Firm*—Greenlee, Winner & Sullivan, PC

[57] ABSTRACT

A microwave susceptor bed useful for sintering ceramics, ceramic composites and metal powders is disclosed. The susceptor bed contains granules of a major amount of a microwave susceptor material, and a minor amount of a refractory parting agent, either dispersed in the susceptor material, or as a coating on the susceptor material. Alumina is the preferred susceptor material. Carbon is the most preferred parting agent. A sintering process using the bed and novel silicon nitride products produced thereby are described.

3 Claims, 4 Drawing Sheets

SINTERED SILICON NITRIDE PRODUCT

This application is a continuation of U.S. patent application Ser. No. 08/443,411, filed May 17, 1995, now abandoned, which is a divisional application of U.S. patent application Ser. No. 08/220,840, filed Mar. 31, 1994, now abandoned.

FIELD OF THE INVENTION

This invention relates to microwave sintering processes for ceramic materials, to microwave susceptor beds for such processes and to sintered ceramic products having novel, superior properties derived from the microwave sintering process.

BACKGROUND OF THE INVENTION

Many ceramic (or ceramic composite) materials are used in the production of industrial cutting tools and components. Powders of these materials are typically pressed into shaped preforms which are then sintered at high temperatures (1000° to 2000° C. depending on the material) to densify and strengthen the tool or wear surface. Silicon nitride ceramics are particularly preferred for industrial cutting tools because of their high strength, fracture toughness, wear resistance and high temperature properties.

Ceramic materials are quite difficult to sinter to nearly full density. Hence a common manufacturing process includes "hot pressing", wherein a disc of the ceramic powder material of interest is pressed in a high temperature furnace using a mechanical press. The hot pressed disc is then sliced, diced or core drilled to obtain small ceramic work pieces of the desired shape and size. These are expensive processes.

In the conventional sintering processes, the preform of the ceramic powder is brought up to its sintering temperature in a radiant heat oven. In order to produce crack-free products, the sintering process is conducted with a slow heating rate. Furnace cycle times are in the order of many hours. The high temperatures and long heating times can lead to undesired decomposition in the ceramic materials being sintered.

Many ceramic materials are not capable of being sintered to the desired densities (typically greater than 98% of theoretical density). Expensive post sintering processes such as hot isostatic pressing are needed.

Most ceramic materials are "transparent" to microwave energy, that is microwaves can pass through them. As microwaves pass through the ceramic, some energy is absorbed by the ceramic body. This energy is converted to heat and is capable of heating the ceramic body volumetrically (uniform heating through the volume). Microwave heating of ceramics has many advantages which derive from a much more rapid heating rate. Higher heating rates can result in better densification. Rapid microwave heating can also reduce the ultimate temperature necessary to achieve densification. Improved rapid heating to lower ultimate temperatures can lead to the production of denser ceramic materials with finer grain size. These are important features in producing high strength, wear resistant ceramics.

In spite of the advantages to be gained by microwave sintering, there are several problems which have hindered its application with ceramic powders. Many ceramic materials do not couple well with microwave radiation at low temperatures, that is they are poor microwave susceptors below about 500° C. Thus, to apply microwave energy for sintering, many ceramics need to be preheated by conduction, convection or radiation from another source such as a flame or a heating element, or a microwave susceptor material which couples with the microwave radiation, at least until a high enough temperature is reached, after which the ceramic couples with the microwave radiation. When microwave susceptors are used as a packed bed around the ceramic or metal materials to be sintered, uneven heating is often experienced. Some microwave susceptors, such as carbon, become conductors at higher temperatures, which can lead to uneven heating or arcing. Also, as the ceramic is sintered, it shrinks due to densification, and can lose contact with the susceptor bed. Volume shrinkage during sintering is usually about 50 percent. Many microwave susceptors may themselves sinter or fuse together in the susceptor bed, leading to uneven or inefficient sintering of the product. Still other microwave susceptor materials may decompose, contaminate or react with the material to be sintered.

Canadian Patent Application 2,000,109 of Apté et al., laid open on Apr. 3, 1991, describes a microwave sintering process for certain non-susceptor materials such as alpha alumina in a powder bed of susceptor materials such as sub-alpha alumina. Canadian Patent Application 2,001,062 of Apté et al., laid open on Apr. 19, 1991, discloses a microwave sintering process for sintering certain ceramics including silicon carbide, silicon nitride and aluminum nitride. A packed powder bed consisting of a microwave susceptor (ex. metal carbides, carbon, porcelain, soda-lime glass and barium titanate), an oxygen getter (ex. metal carbides, carbon and oxidization metals), a thermal conductor (ex. boron nitride, aluminum nitride and metals), and a protective material to generate a localized protective atmosphere (ex. metal carbides, carbon, $MoS_2$, lead based ceramics). These and other prior art approaches to microwave sintering of ceramics in powder beds still present problems:

1. Many of the prior art processes utilize complex microwave susceptor beds wherein the materials are chosen to, in situ, form and maintain a controlled, protective atmosphere during sintering. Thus, for sintering of silicon nitride, the packed bed might contain silicon nitride. However, using a solid nitride to provide a protective nitrogen atmosphere is problematic since the silicon nitride powder in the bed decomposes to release nitrogen at the same temperature as the silicon nitride ceramic piece also starts to decompose. The oxygen available at lower temperatures will thus oxidize the ceramic pieces.
2. Many of the powder susceptor beds themselves sinter during the sintering process, creating large gaps in the bed, and uneven or inefficient heating.
3. The use of a packed powder bed to prevent oxygen entering the bed during sintering necessitates a careful, time consuming packing step. Oxygen trapped in the bed is available for oxidizing the work pieces.
4. The use of other materials such as silicon carbide or carbon, as the main ingredients of a microwave susceptor bed is problematic. These materials become good electrical conductors, and thus poor microwave susceptors, as the temperature increases during sintering. They can also shield the ceramic pieces from the microwave field, i.e. prevent microwave energy from reaching the ceramic pieces.
5. Many of the materials suggested for use as microwave susceptor bed ingredients are expensive ceramics (ex. silicon nitride and boron nitride.).

One prior art approach to microwave sintering of ceramics is to use higher frequency microwaves (see for example U.S. Pat. No. 4,963,709, issued Oct. 16, 1990, to Kimrey et al.). At these higher frequencies (ex. 14, 28 and 60 GHz), the ceramic material couples with microwaves, for direct sintering. However, the cost of high frequency, specialized microwave equipment is prohibitive for most ceramic sintering applications. At the commonly used frequencies (915 MHz and 2.45 GHz) equipment is relatively inexpensive and readily available.

There remains a need for an effective microwave sintering process to sinter ceramic and ceramic composite materials.

SUMMARY OF THE INVENTION

The inventors prior experience with powder microwave susceptor beds highlighted certain of the above problems. Basically, the nature of powder susceptor beds gave rise to the need for different beds for different sintering materials. Oxide-type beds, such as hydrated or sub alpha alumina beds, were used to sinter ceramic oxides, and non-oxide beds, such as silicon carbide, silicon nitride and boron carbide, were used to sinter non-oxide ceramics such as carbides and nitrides. The packed powder beds prevented the flow of gases through the bed, thus preventing the use of protective gaseous atmospheres during sintering. The protective atmosphere had to be provided by including a material which would form a localized protective atmosphere within the bed during sintering. However, the powder beds occluded a large volume of air (oxygen) which could not escape and thus would react with both the material to be sintered and the bed itself.

The inventors discovered a microwave susceptor bed useful for sintering both oxide and non-oxide ceramics, and which overcame many of the above problems associated with prior art powder beds. The susceptor bed of the present invention is granular such that it forms a porous bed which is permeable to flowing gases. The bed is formed from a microwave susceptor and a parting agent. The parting agent is functional to prevent fusing, agglomeration or sintering of the susceptor material at high sintering temperatures. This creates a free flowing susceptor bed which can collapse with shrinkage of the material to be sintered, leading to more uniform and efficient heating. The granular nature of the susceptor bed allows for the direct introduction of a protective gaseous atmosphere, such as by flowing nitrogen, into the susceptor bed during the sintering process. The large granule size results in a susceptor bed with larger interconnected pores to provide permeability to flowing gases. This has enabled the use of an oxide material such as alumina, zirconia or thoria, when combined with a parting agent, as a microwave susceptor to sinter both oxide or non-oxide ceramics.

The invention broadly extends to a microwave sintering bed comprising:

granules of:

(a) a major amount of a microwave susceptor material; and (b) a minor amount of a refractory parting agent either dispersed in the susceptor material or provided as a coating on the susceptor material. Preferred susceptor materials are ceramics such as refractory oxides which couple with microwaves between about room temperature to 2000° C. If the susceptor material does not couple at low temperatures, the parting agent may be chosen to couple with microwaves at these low temperatures (up to about 500° C.). Alumina, zirconia and thoria are exemplary susceptor materials. Preferred parting agents are carbon, silicon carbide, molybdenum disulphide and zirconia. The most preferred susceptor bed is formed from alumina and carbon, alumina being included in an amount of about 90 to 98 percent weight, and carbon being included in an amount of about 2 to 10 percent by weight. Preferred granule sizes, in order to create sufficient porosity while preventing excessive heat loss, are 500 microns to 10 mm, more preferably 0.5 to 3 mm.

The invention also broadly extends to a process of sintering ceramics, ceramic composites or metal materials, comprising:

surrounding the material with a granular susceptor bed, flowing a protective gas around the materials, and irradiating the material and bed with microwave energy, said bed comprising:

(a) a major amount of a microwave susceptor material, and (b) a minor amount of a refractory parting agent, either dispersed in the susceptor material, or as a coating on the susceptor material. For uniform and efficient heating, the process is most preferably practised with the material to be sintered embedded in the susceptor bed and by introducing a protective gas directly into the bed. When the process is practised in the sintering of silicon nitride, nitrogen is the preferred protective gas.

The invention also broadly extends to a novel form of sintered silicon nitride characterized by:

(a) greater than 95 percent theoretical density;

(b) fine grains which are less than about 1 micron in diameter and less than about 5 microns in length; and (c) a colour which is not darker than light grey.

Commercially available sintered silicon nitride products are generally dark grey to black in colour, indicating a higher percentage of silicon decomposition products are included than are present in products formed by the process of the present invention. The grain size of commercially available sintered silicon nitride products is generally 1–3 microns in diameter and 10–20 microns in length.

Throughout the disclosure and claims the term "microwave susceptor" is meant to include a material that couples with microwaves to the extent that it will raise the temperature of the material to be sintered either to the desired sintering temperature or at least to a temperature at which the material to be sintered couples with microwaves.

Throughout the disclosure and claims, the terms "granules" or "granular" are meant to denote agglomerates or pellets and the like of powdered particles, shaped and sized so that a bed of the granules is free flowing and relatively permeable to flowing gases. These terms are distinct from powder materials, which allow very limited gas movement by diffusion.

DESCRIPTION OF THE PREFERRED EMBODIMENT

The microwave susceptor bed of the present invention includes at least two components:

(a) a major amount of a microwave susceptor material; and (b) a minor amount of a refractory parting agent dispersed in, or coating, the microwave susceptor material.

The microwave susceptor material is chosen according to the material to be sintered. It should be stable and microwave susceptible at the high temperatures of sintering. Most preferred susceptors are refractory oxides including alumina, zirconia and thoria. Alumina is most preferred. Alpha alumina and alumina hydrate are the preferred forms. Hydrated alumina is a good microwave susceptor from room temperature to over 2000° C. Alpha alumina does not couple well at room temperature, but couples very well above 400° C. When alpha alumina is used as the microwave susceptor, the parting agent should be chosen to provide microwave coupling from room temperature up to about 400° C. If zirconia is used, cubic or tetragonal zirconia are preferred forms. Zirconia and thoria are less preferred because of their higher cost, without providing a heating advantage over alumina.

The parting agent is a refractory material which, when included in a minor amount, prevents the susceptor material from substantial sintering, agglomerating or fusing at high temperature, thus creating a free flowing susceptor bed, even at the high sintering temperatures. The parting agent is a refractory which is stable at the high sintering temperatures, that is it does not decompose or react with either the susceptor material or the material to be sintered. Carbon, silicon carbide and zirconia are preferred parting agents, carbon being the most preferred.

Impurities in the susceptor bed materials such as oxides or nitrides (ex. $Fe_2O_3$, $SiO_2$, BN) that melt or react below the sintering temperatures to be reached are detrimental and should be kept below about 1 or 2 percent by weight.

The susceptor bed is granular, formed of agglomerates or pellets having a size such that a high percentage porosity exists in the bed (preferably greater than 30 percent, most preferably about 50 percent). The granules are formed from fine powders by known pelletizing or agglomerating processes, typically in disc or drum pelletizers. The susceptor and parting agent materials are tumbled with appropriate binders, such as polyvinyl alcohol, and water until the desired particle size is obtained. If the parting agent is to be generally dispersed throughout the particles, the susceptor material is tumbled with the parting agent. If the parting agent is a coating on the susceptor material, it is added after the susceptor is agglomerated to the desired granule size. Multiple coatings may be used. The granules may also be formed by making a paste out of powders of the susceptor and parting agent materials, extruding the paste into various shapes and cutting up the extrudates to the desired size.

Generally, the granules have a spheroidal or cylindrical shape, although other irregular shapes may be used, provided they form a free flowing material. A granule size range of about 500 microns to 10 mm is preferred. More preferably, a granule size of 0.5 to 3 mm is used. Most preferably the granule size is about 1 to 3 mm.

The amount of paring agent used is a minor portion of that of the susceptor material, so as to impart the free flowing property to the granules without detracting from the heating ability of the susceptor material. Generally, less than 10 percent by weight is needed. When carbon is the preferred parting agent, and alumina is the preferred susceptor material, the amount of parting agent is preferably in the range of 2–10 percent by weight. Significantly higher amounts may lead to uneven heating as carbon conducts at high sintering temperatures. However, at lower temperatures carbon itself couples with microwaves, providing some assistance in heating.

The free flowing granular microwave susceptor bed of the present invention is useful in sintering a wide range of products, including ceramics, ceramic composites and metal powders. The bed is particularly useful in sintering ceramic nitrides, including silicon nitride and aluminum nitride, ceramic composites such as aluminum oxide and titanium carbide, and metal powders such as nickel and copper powders. The material to be sintered may exist in a variety of forms/shapes. For example, cutting tools of ceramics such as silicon nitride are formed as pressed powder preforms.

The material or work pieces to be sintered may be embedded directly in the granular susceptor bed (which is most preferred) or may be sintered on top of the granular bed or in a microwave transparent crucible/container within the susceptor bed. Many ceramic materials, such as silicon nitride, must be protected from the environment during sintering to prevent the formation of undesired decomposition or reaction products such as oxides. In such cases, a protective gaseous atmosphere is preferably provided around the material to be sintered. When the material to be sintered is either embedded in the granular susceptor bed, or placed on top of the bed, the protective gaseous atmosphere is provided by directly introducing a protective gas into the bed below or adjacent the material to be sintered. When the material to be sintered is housed in a separate crucible/container, the protective gas is introduced into the crucible/container. Any nonreacting gas capable of protecting the material to be sintered may be used. Typically nitrogen, hydrogen or argon are used.

The microwave equipment used to achieve the microwave sintering process is generally conventional. The microwave equipment consists of a magnetron and a resonant cavity connected by a waveguide. Within the resonant cavity is housing, which holds the microwave susceptor bed and the work pieces to be sintered. Normally, microwave radiation in a conventional microwave oven is in a frequency of 2.45 GHz. Lower frequencies might be utilized. At higher frequencies, microwave coupling with the sintering material is not problematic, so the invention has little application.

Figure 1:
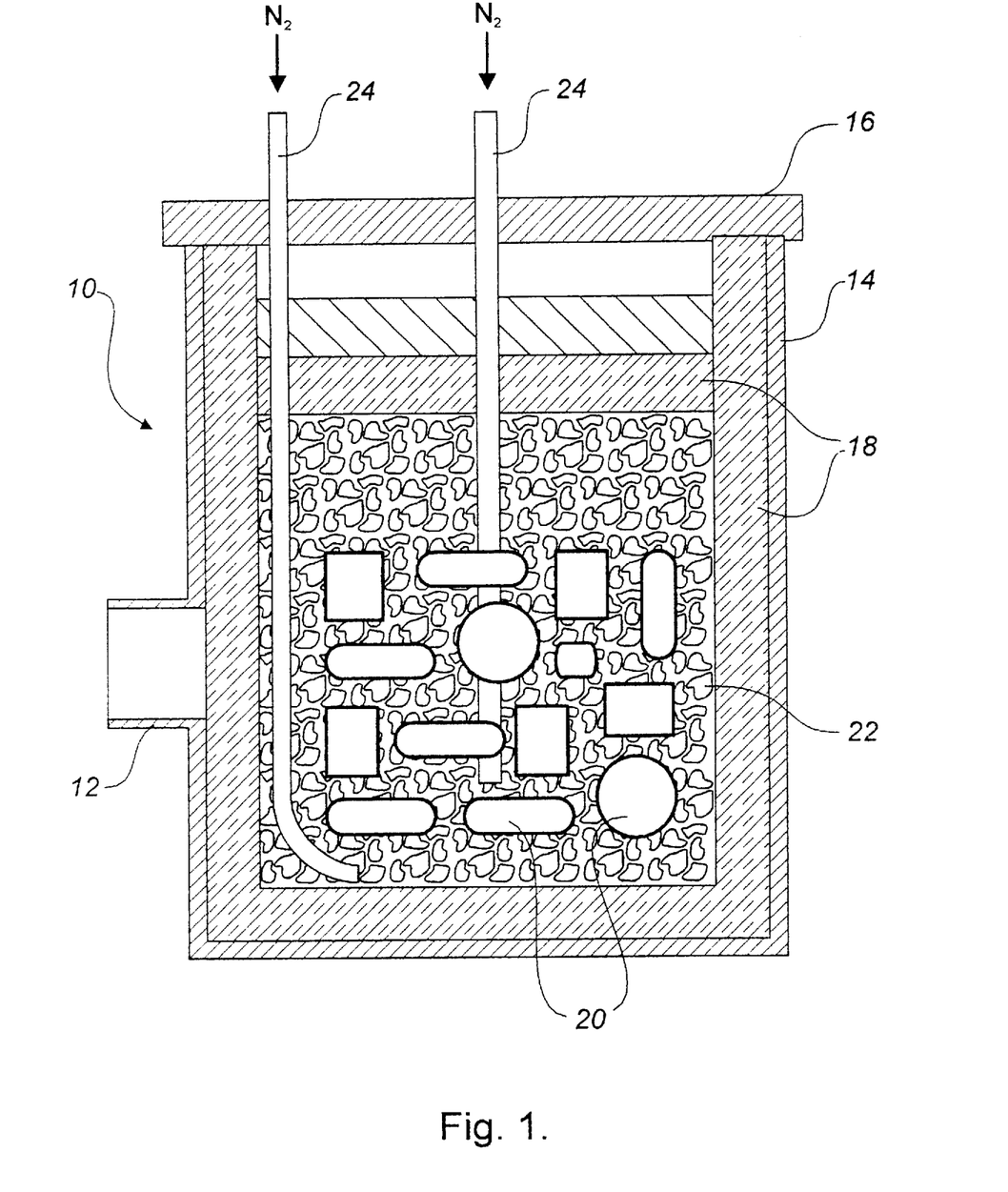
FIG. 1 is a vertical cross-sectional view of the assembled, insulated microwave susceptor bed of the present invention, showing the granular microwave susceptor bed surrounding the work pieces to be sintered.

FIG. 1 shows the housing 10, communicating with a microwave waveguide 12. The housing 10 consists of a metallic applicator (container) 14, and a removable metal cover 16, so arranged to prevent microwave leakage. A quartz window hole (not shown) exists between the waveguide and the applicator 14 to allow for passage of the microwaves into the applicator 14. The applicator 14 is lined with microwave transparent insulation 18 such as ceramic fibre "CER-WOOL" HTZ8 (Premier Refractories and Chemicals Inc., King of Prussia, Pa. U.S.A.). The work pieces 20 to be sintered and the granular microwave susceptor bed 22 are loaded into cavity within the insulation 18. No packing of the susceptor bed is necessary. The granular susceptor bed 22 is simply poured around the work pieces 20 as they are added in multiple layers. Further microwave transparent insulation is then laid on top of the susceptor bed 22. One or more gas inlet tubes 24 extend through the metal cover 16 to the base of the susceptor bed 22. Nitrogen may escape from the susceptor bed through the fitting cover 16 or through holes (not shown) drilled in the metal applicator to enable gas flow.

Figure 2:
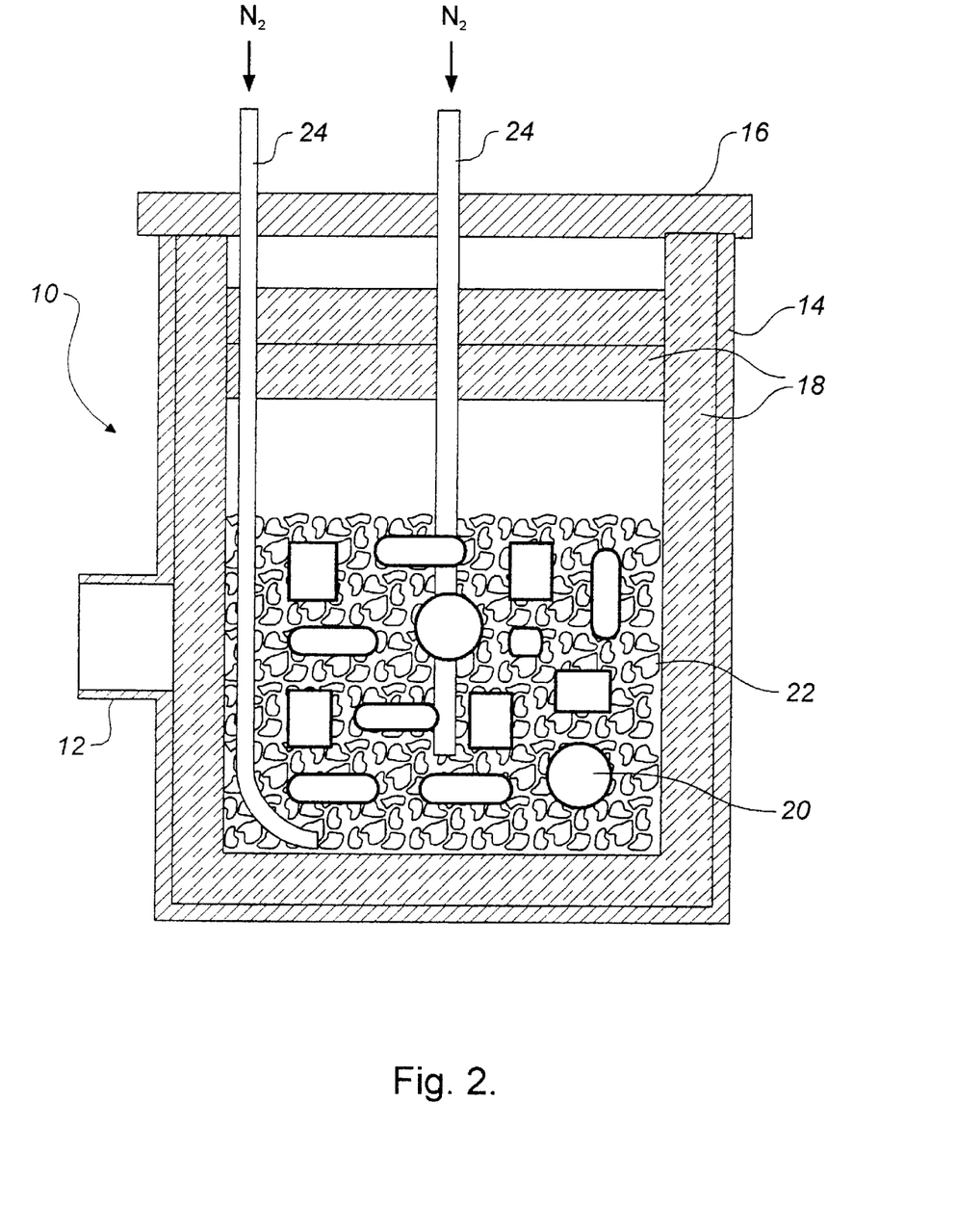
FIG. 2 is the same view as FIG. 1, after sintering, showing the shrinkage of the work pieces in the free flowing granular microwave susceptor bed.

FIG. 2 illustrates the microwave susceptor bed of the present invention after sintering. When compared to FIG. 1, it will be noted that the sintered work pieces 20 have shrunk during sintering, and the free flowing granular bed 22 has collapsed around the work pieces 20.

Figure 3:
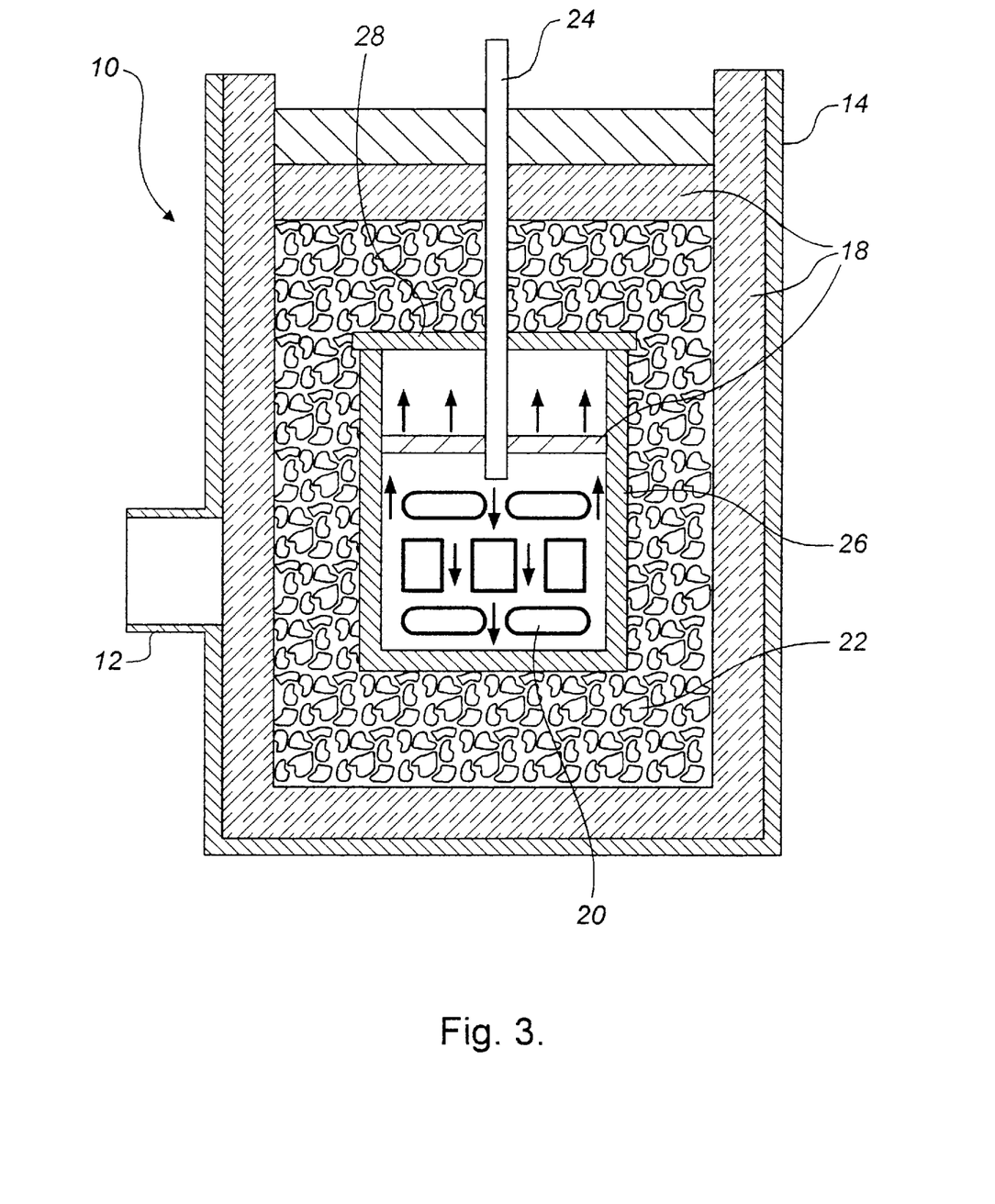
FIG. 3 is a vertical cross-sectional view of the assembled insulated microwave susceptor bed wherein the ceramic work pieces are housed within an internal crucible in the granular microwave susceptor bed.

FIG. 3 shows a less preferred arrangement of the susceptor bed 22 in the housing 10. This set up is most suitable when the materials to be sintered would be affected by even trace contamination coming from the susceptor bed, or when the materials to be sintered need to be exposed to carefully controlled atmospheres which could react with the susceptor bed. A crucible 26 is embedded within the susceptor bed 22 in order to house the work pieces 20. The crucible 26 may be made from any material which is transparent to microwave energy, is refractory, stable at sintering temperatures and does not interact with the work pieces to be sintered. Alumina and quartz are preferred. The crucible has a fitting crucible cover 28. The work pieces 20 may be placed in a single layer, or stacked within the crucible 26. Microwave transparent insulation 18 is placed above the work pieces within the crucible 26. The gas inlet tube(s) 24 extends into the crucible 26 to ensure a gas flow around the work pieces 20. The susceptor bed 22 is covered with microwave transparent insulation 18.

The microwave sintering bed of the present invention has important advantages over the prior art:

1) The free flowing granular bed eliminates the need for careful and time consuming packing of either the ceramic pieces or a powder susceptor bed around the pieces to be sintered.

2) The free flowing bed follows the shrinking work pieces during sintering, allowing the pieces to be heated uniformly until they are fully sintered.

3) The porous, permeable nature of the bed allows the work pieces to be protected against decomposition by introducing a protective gaseous atmosphere into the bed during sintering.

4) The preferred microwave susceptors, alumina, zirconia and thoria, are capable or rapid, uniform heating to temperatures above 2000° C.

5) The microwave susceptor bed is capable of sintering a large range of ceramic and ceramic composite pieces. The susceptor bed does not have to be altered for each type of material to be sintered, as with many of the prior art approaches.

6) The microwave susceptor bed enables the work pieces to be sintered to reach a high density, at least as great as 95%, and typically greater than 98%. This eliminates the need for expensive post sintering treatments such as HIPping.

7) Rapid heating with microwave process of the present invention can lead to improved properties in the sintered material. In particular, the invention is able to produce silicon nitride with higher density, finer grain size and lower percentage of decomposition products, than achieved by prior art processes.

In addition to ceramics and ceramic composites, the susceptor bed of the present invention has been demonstrated in sintering bodies made from metal powders. Metal powders often do not couple well with microwave energy, but can be heated indirectly by microwaves in the susceptor bed of the present invention.

The invention is further illustrated by the following non-limiting examples.

EXAMPLE 1

This example describes one process for making the granular susceptor bed for microwave heating and its ability to heat to high sintering temperatures.

Five kilograms, hydrated alumina, −200 mesh in size was mixed with 500 g carbon black having a mean particle size of about 1 micron. The two were agglomerated in a disc pelletizer called an Eirich Mixer (Eirich Machines Ltd., Maple, Ontario, Canada). The agglomeration process was assisted by using polyvinyl alcohol (50 mL for 5 kg alumina) as a binder to provide strength to the agglomerates. Suitable quantities of water (about 500 ml) were sprayed onto the powder mix in a well established procedure provided by the manufacturer of the equipment. The agglomeration was stopped after 30 minutes when the agglomerates appeared to be about 2 to 3 mm in size (on average) but none were measured to be in excess of 10 mm in size.

The agglomerates were dried out in a pan at 70° C. for 24 hours. The dry agglomerates were placed in a microwave applicator lined with CER-WOOL insulation in a microwave field. The agglomerates were subjected to microwave energy starting at 500 W and the energy was increased every 10 minutes by 100 W to 1400 W. The temperature at the centre was measured as 1850° C. After microwave heating, the granular susceptor bed remained as distinct, free flowing granules, that is the agglomerates did not adhere to each other. Similar results were obtained when alpha alumina powder was substituted for hydrated alumina. This example shows that the susceptor bed is capable of generating temperatures of 1850° C., adequate to sinter many ceramic, metal and composite materials. The free flowing nature of the susceptor bed before, during and after the sintering process demonstrated the ability of the bed to collapse around materials to be sintered.

EXAMPLE 2

This example shows an alternative method for making a suitable granular microwave susceptor bed in accordance with the present invention.

Five kilograms of hydrated alumina was agglomerated as in Example 1 using 50 mL polyvinyl alcohol as a binder and 500 mL of water. Once the alumina had agglomerated to about 2 or 3 mm spherules, carbon powder similar to the one used in Example 1, was added slowly while the agglomerator drum continued to rotate. A total of 250 g of carbon was added. The alumina spherules were gradually coated with carbon. After another 15 minutes, the process was stopped and the spherules were dried at 70° C. for 24 hours.

These agglomerates were placed in a microwave field as in Example 1 and were subjected to a maximum of 1400 W. Once again, a maximum temperature of 1850° C. was obtained. It was observed that the spherules were loose at the end of the experiment. Similar results were obtained when alpha alumina was substituted for alumina hydrate.

EXAMPLE 3

This example shows that the role of the carbon as a parting agent for the spherules to prevent the formation of lumps.

Spherules of hydrated alumina (without the carbon parting agent) were prepared as in Examples 1 and 2 and dried in an oven at 70° C. for 24 hours. These agglomerates were placed in a microwave applicator and subjected to microwave power from 500 to 1500 W as in the previous examples. After 1200 W power was reached, it was noticed that there were hot spots within the susceptor bed, as evidenced by uneven light emission seen through the Fibrefrax insulation. At higher powers there were instabilities in microwave operation leading to an increase in reflected power. The temperature measured in the bed varied from 1400° C. to over 2000° C. (as evidenced by damage to the sapphire sheath used in the temperature sensor). After the assemblage was cooled, some agglomerates remained separated while others had lumped and even fused together. These lumps are deleterious since their larger size limits the ability of the susceptor bed particles to flow into the void spaces created by the shrinkage of the materials to be sintered in the bed during the microwave process. This limits heat transfer and heating efficiencies of the sintering process. Also, hot spots in the bed cause undesired decomposition products to form in the sintered materials.

EXAMPLE 4

This example shows the use of the susceptor bed for sintering silicon nitride.

An assembly of insulators, silicon nitride samples, and susceptor bed was prepared as follows:

The granular susceptor bed was made using the procedure indicated in Example 1. One kilogram silicon nitride powder (Ube, SNE-10, 0.3 micrometer mean diameter) was mixed with 5 wt % alumina (Alcoa A-16 SG. 0.5 micrometer mean diameter) and 5 wt % yttria (H.C. Starck grade C fine). The mixing was performed using hexane as a liquid medium and alumina balls (¼" diameter) as dispersing media, on a ball mill for 16 hours. The mixture was dried in air at room temperature, and the dried powder was compacted in a tool steel die at a pressure of 40,000 psi (275 MPa) using a manually operated hydraulic press (Carver laboratory press, Model M). The compacted powder was further treated by leostatic pressing at 60,000 psi. (410 MPa) The "green" compact so prepared has a bulk density of 1.72 g/mL which is 53% of the theoretical value for this composition.

The insulation, susceptor bed and the ceramic pieces were assembled as shown in FIG. 1. The system was purged with nitrogen for 10 minutes and the flow was then reduced to about 0.5 mL per minute. The assemblage was energized with microwaves starting at 500 W and then increasing the power by 100 W every 10 minutes. When the power reached 1200 W it was held constant for 20 minutes and then shut off. The assemblage was allowed to cool under flowing nitrogen. It was found that the silicon nitride compacts had shrunk and a density of 3.2 g/mL was measured. This density is 98.5% of the theoretical value for this composition. The sintered pieces appeared light grey in colour and had acicular grains about 0.3 microns diameter and 1 to 2 microns long.

Silicon nitride, when sintered using the sintering aids of the type used in this example, forms acicular (needle shaped) grains, with a crystal structure known as beta silicon nitride. The microstructure of such a grain structure is specified by the average diameter and length of the individual needles. Sintered silicon nitride crystals in commercially available cutting tools were measured to have grain sizes of about 1–3 microns in diameter and 10–20 microns in length.

The colour of the sintered pieces from this example (after polishing) was light grey, compared to the dark grey or black appearance of commercial silicon nitride cutting tools. On a standard colour chart, for instance the Rock-Color Chart of the Geological Society of America (printed by Huyskes-Enschede, Netherlands), the work pieces formed by the present invention were no darker than light grey, between N7 and N8 in the chart. Commercial silicon nitride cutting tools were dark grey to black, between N2 and N3 on the colour chart.

When the test was repeated with a susceptor bed made following the practice of Example 2, the results obtained were similar.

EXAMPLE 5

This example shows the use of the susceptor bed for sintering aluminum nitride.

An assembly of insulators, aluminum nitride compacts was prepared as follows:

The susceptor bed was made following the procedure outlined in Example 1. Two hundred grams of aluminum nitride obtained from Tokuyama Soda. (Grade F) was mixed with 3 wt % yttria (H.C. Stark Grade C fine). The mixing was performed using hexane as a liquid medium and alumina balls (¼" diameter) as dispersing media on a ball mill for 16 hours. The mixture was dried in air at room temperature (25° C). Powder from the dried batch was compacted in a tool steel die at a pressure of 40,000 psi (275 MPa) using a manually operated hydraulic press (Carver, Laboratory press model M). The powder compact was further treated by cold isostatic pressing at 60,000 psi (410 MPa). The green compact had a density of 1.67 g/mL which is 51% of the theoretical value for this composition.

The insulation, the susceptor bed and the ceramic pieces were assembled as shown in FIG. 1. The system was purged with flowing nitrogen for about 10 minutes and then the flow was reduced to about 0.5 mL/minute. The assemblage was energized with microwaves starting as a power input of 500 W and then increasing the power by 100 W every 10 minutes. When the power reached 1200 W it was held constant for 20 minutes and then shut off. The assemblage was cooled in flowing nitrogen. It was found that the aluminum nitride compacts had shrunk to about half their original size and had a sintered density of 3.18 g/mL. The density is 97% of the theoretical value for this composition.

When the procedure was repeated using the susceptor bed described in Example 2 the results obtained were similar to these. Normal sintering of aluminum nitride is generally performed over 24 hours in electrical furnaces requiring 25 to 90 kW power supplies.

EXAMPLE 6

This example illustrates the beneficial effect of microwave sintering with respect to any side reactions occurring in the material to be sintered during convention sintering.

Silicon nitride ceramics are sintered at temperature in the range of 1750° to 1850° C. In this temperature range, silicon nitride can decompose releasing silicon and nitrogen gas. The following features have been documented:

the extent of decomposition increases with increasing temperature; and the extent of decomposition increases with the duration which the ceramic material experiences the high temperature.

the release of silicon in minute quantities (<0.001%) causes silicon nitride to turn black in colour.

Microwave sintered silicon nitride ceramics produced following the practice in Example 4 appear light grey in colour. This compares to the dark grey to black colour of commercially available silicon nitride produced by conventional sintering and hot pressing.

Green ceramic compacts of silicon nitride formed as in Example 4 were heated in an electrical resistance furnace to 1800° C. over a period of 12 hours and soaked for a period of 4 hours in a nitrogen atmosphere. On cooling it was found that the silicon nitride pieces were dark black in colour.

This shows that microwave processing in accordance with the present invention significantly reduces or eliminates the decomposition of silicon nitride during sintering.

EXAMPLE 7

This example illustrates the beneficial effect of rapid heating terms of the grain size of the sintered product.

Silicon nitride compacts were prepared and sintered following the practice described in Example 4. After the samples were sintered, the sintered pieces were cut, polished, and etched in a microwave plasma in an atmosphere of fluorocarbon gases. The samples were examined under a scanning electron microscope. The micro structure revealed very fine grains.

The grains of sintered silicon nitride appear as elongated needles. The sample examined revealed an acicular structure with needles 0.3 to 0.5 microns diameter and 1 to 2 microns long.

Samples of commercially available silicon nitride ceramics (obtained from Kennametal Inc. of Latrobe, Pa., U.S.A. and designated as KY-2000) were similarly prepared and generally revealed a structure with needles between 1 and 3 microns diameter and 10 to 20 microns long.

This reveals the fine grained feature of microwave sintered silicon nitride ceramics prepared in accordance with the present invention. Finer grained material wears at slower rates than coarse grained material under similar test conditions. Finer grained materials also have more uniform properties such as hardness and toughness.

EXAMPLE 8

This example shows the beneficial effect of microwave sintering in accordance with the present invention on the properties of silicon nitride as demonstrated by the wear performance during single point turning on a high speed lathe.

Silicon nitride samples were microwave sintered using the practice described in Example 4. The sintered pieces were ground to produce cutting tools which meet the standard tool specification RNGN-45, T6 (ASA standards).

These samples were evaluated at the National Research Council in Ottawa in single point turning on a high speed lathe. The material machined was grey cast iron. The machining parameters were as follows:

| | |
|---|---|
| speed | 2000 surface feet/minute (600 m/min) |
| feed | 0.015"/revolution (0.375 mm/rev) |
| depth of cut | 0.050"/pass (1.250 mm/pass) |

Figure 4:
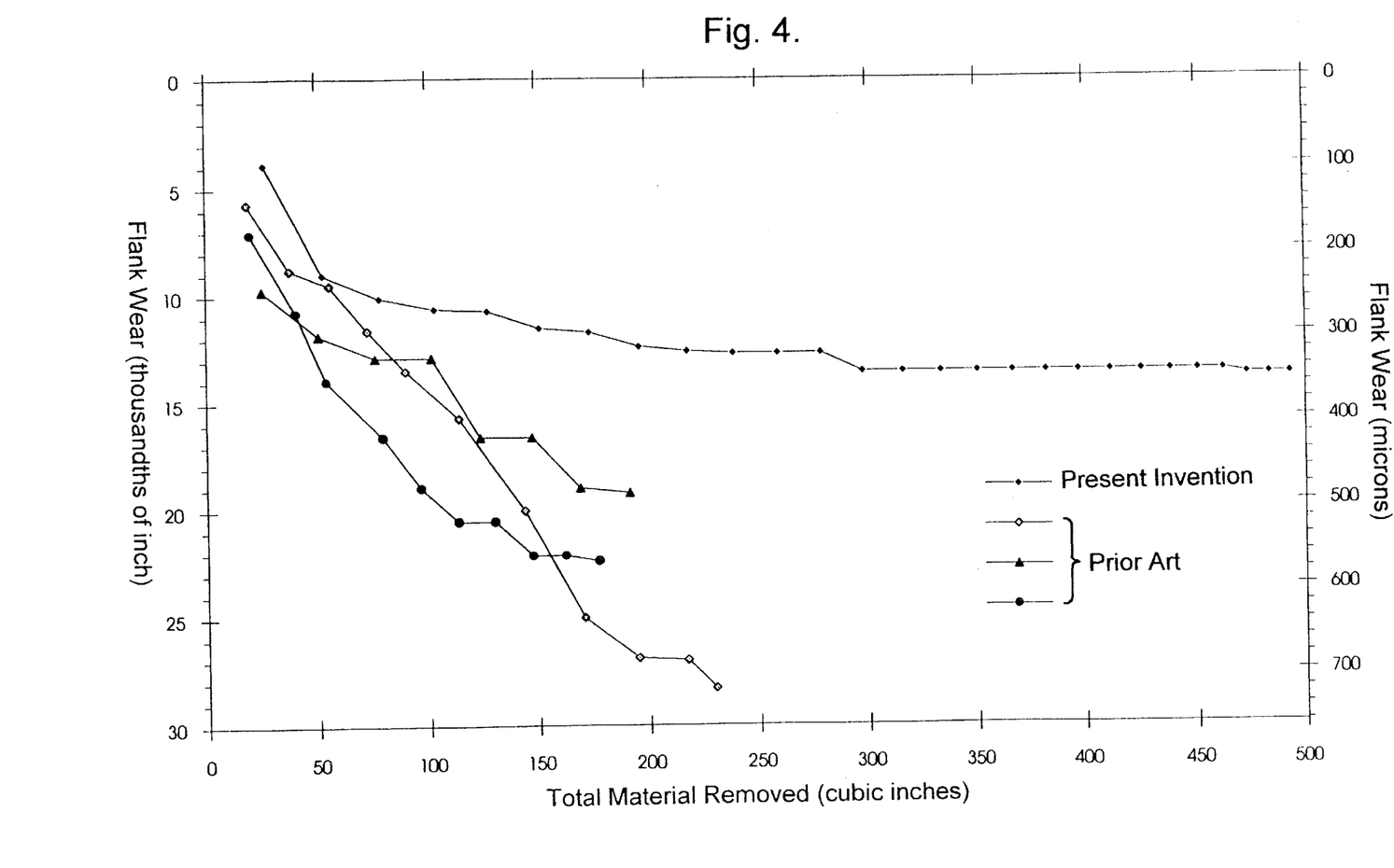
FIG. 4 is a plot of flank wear against cast iron material removed in a cutting wear performance test, comparing silicon nitride tools sintered in accordance with the process of the present invention (top line) against three commercially available silicon nitride tools (bottom three lines).

Similar tests were also performed on three commercially available cutting tool inserts from U.S.A. (KY 2000, Kennamental, Latrobe, Pa.), from Asia (marketed by Newcomer Products Inc., designated as "Newpro Exp"), and from Europe (Grade 690, Sandvlk, Stockholm, Sweden). The results are shown in FIG. 4. The superiority of the microwave sintered inserts is clear when it is realized that tools have to be changed when their wear reaches 0.020 inches (0.5 mm).

EXAMPLE 9

This example shows the limitations of using carbon alone, or and its related materials such as graphite and silicon carbide, for making susceptor beds.

A experiment similar to the one shown in Example 4 was repeated but the susceptor bed was just the carbon black powder. After using the same power for the same duration as in Example 4, the silicon nitride samples were sintered to densities less than 70% of the theoretical value, indicating that the necessary temperatures were not achieved.

In another variation of the same experiment the silicon nitride compacts were placed in a graphite crucible in order to increase the mass of the material that generated the heat from the microwave energy. The assemblage was subjected to the same power cycle as in Example 4. The silicon nitride samples had sintered to a density of 2.5 g/mL which is about 78% of the theoretical value for this composition.

It is clear from these examples that the use of carbon alone as a susceptor bed limits the maximum temperature that can be achieved to values much less those required for sintering ceramics.

EXAMPLE 10

This example shows the use of susceptor bed of the present invention for sintering ceramic composite compacts made of aluminum oxide and titanium carbide.

A batch of $Al_2O_3$ mixed with TiC powder was prepared by ball milling alumina (Alcoa, A16 S.G.) and titanium carbide (H.C. Stark fine grade) in a nalgene jar with hexane as a dispersing liquid and alumina balls (¼ inch dia.) for 16 hours. The powder mixture was dried and compacted in a manually operated hydraulic press (Carver, Laboratory press, model M) at a compaction pressure of 40,000 psi (275 MPa) and further isopressed at 60,000 psi (410 MPa) in a cold isostatic press.

The ceramic compacts were assembled following the practice of Example 4 in an insulation and susceptor bed and then subjected to microwave power of 500 watts. The power was increased to 1500 watts at the usual rate of 100 watts every 10 minutes. The system was held at peak power for 25 minutes and then cooled slowly to room temperature.

The compacts had sintered to a density of 4.00 g/mL which is about 95% of the theoretical value for this composition.

All publications mentioned in this specification are indicative of the level of skill of those skilled in the art to which this invention pertains. All U.S. PATENTS are herein incorporated by reference to the same extent as if each individual Patent was specifically and individually indicated to be incorporated by reference.

The terms and expressions in this specification are used as terms and expressions of description and not of limitation. There is no intention, in using such terms and expressions, of excluding equivalents of the features illustrated and described, it being recognized that the scope of the invention is defined and limited only by the claims which follow.

I claim:

1. A sintered silicon nitride product consisting essentially of:

sintered silicon nitride having the formula $Si_3N_4$, in a compact form with about 5 weight percent each of sintering aids yttria and alumina, and further characterized by:

a) at least 98.5 percent theoretical density;
b) fine grains which are less than about 1 micron in diameter and less than about 5 microns in length; and
c) a color which is not darker than N7 on the N axis of a Rock-Color Chart of the Geological Society of America.

2. The silicon nitride product of claim 1, wherein elemental silicon is present in an amount less than 0.001 percent.

3. The silicon nitride product of claim 1, wherein the grains are between 0.2 and 0.8 microns in diameter and are between 1 and 3 microns in length.

* * * * *